United States Patent [19]
Tang et al.

[11] Patent Number: 5,933,110
[45] Date of Patent: Aug. 3, 1999

[54] VESSEL ATTITUDE DETERMINATION SYSTEM AND METHOD

[75] Inventors: Wang Tang, Poway; Donald W. English, La Mesa; Eugene B. Howell, San Diego, all of Calif.

[73] Assignee: Arinc, Inc., Annapolis, Md.

[21] Appl. No.: 09/114,298

[22] Filed: Jul. 13, 1998

[51] Int. Cl.$^6$ .............................. G01S 5/02; H04B 7/185
[52] U.S. Cl. .............................. 342/357.11; 342/357.06; 701/213; 701/215
[58] Field of Search .................................. 342/352, 357; 701/213, 215

[56] References Cited

U.S. PATENT DOCUMENTS

| | | |
|---|---|---|
| 4,881,080 | 11/1989 | Jablonski . |
| 4,990,922 | 2/1991 | Young et al. . |
| 5,021,792 | 6/1991 | Hwang . |
| 5,072,227 | 12/1991 | Hatch ........................................ 342/357 |
| 5,296,861 | 3/1994 | Knight . |
| 5,349,531 | 9/1994 | Sato et al. . |
| 5,506,588 | 4/1996 | Diefes et al. . |
| 5,534,875 | 7/1996 | Diefes et al. . |
| 5,543,804 | 8/1996 | Buchler et al. ........................... 342/357 |
| 5,548,293 | 8/1996 | Cohen . |
| 5,561,432 | 10/1996 | Knight .................................... 342/357 |
| 5,748,145 | 5/1998 | Talbot et al. ............................ 342/357 |

*Primary Examiner*—Thomas Tarcza
*Assistant Examiner*—Dao L. Phan
*Attorney, Agent, or Firm*—Oliff & Berridge, PLC

[57] ABSTRACT

A portable attitude determination apparatus and method are disclosed that can be used with a ship docking system. At least two receivers on a vessel receive Global Positioning System (GPS) satellite data. GPS carrier phase measurements are used to determine attitude (i.e., roll, pitch and yaw angles) of a moving platform. The phase measurements are processed to determine a precise vector from one receiver phase center to the other. The azimuth and elevation of a baseline vector is then computed. Float ambiguities between the two receivers are determined, and are used to provide initial estimates of antenna baseline length and attitude. A search procedure is then employed to find the actual integer ambiguities. Only GPS observables are needed; no other external data input is required.

30 Claims, 4 Drawing Sheets

VESSEL ATTITUDE DETERMINATION SYSTEM AND METHOD

BACKGROUND OF THE INVENTION

1. Field of Invention

This invention relates generally to systems and methods for determining headings, positions, and velocities of moving vessels. The invention also relates to ship docking systems. In particular, it pertains to a system and method for determining position, attitude, and velocity of ships that can be used in a ship docking system.

2. Description of Related Art

Conventional docking aid systems can generally be grouped into two categories: those based on radar technology, and those based on laser technology. Some systems may even operate in dual mode. Both types of systems install sensors near the dock to measure ship navigation information such as distance to the dock and approach speed. This information is then made available to a pilot onboard the ship. Since lasers and radar have to be installed and operated on the dock, they can not easily be made portable. Also, since the operational range is rather limited, a large number of such systems must be installed for each port, making wide use of such aiding devices prohibitively expensive.

The declaration of Full Operational Capability (FOC) of the Global Positioning System (GPS) by the U.S. Air Force in July 1995 marked the beginning of a new era in navigation technology. The U.S. Coast Guard has upgraded more than 50 existing radiobeacons with the capability of broadcasting differential GPS (DGPS) corrections. With appropriate equipment, mariners inside the coverage areas can achieve 5 to 10 meters absolute positioning accuracy. Indeed, the DGPS-based navigation aid has been widely used in various marine navigation applications from open ocean to harbor approach. However, the existing DGPS systems cannot be used directly for a ship docking application because the ship's heading, which is critical in the final docking phase, cannot be determined with conventional DGPS methods.

To partially ameliorate the DGPS deficiency in heading information, a heading sensor may be integrated with a DGPS system. Unfortunately, conventional heading sensors, such as magnetic compasses, gyrocompasses, and fluxgates, either do not provide the accuracy required or need a lengthy alignment process before operation. None of these sensors can meet the requirements of precise accuracy and easy installation. Nor can a sufficient level of accuracy be achieved by differential operation alone, which only processes pseudorange measurements.

SUMMARY OF THE INVENTION

The present invention provides a portable attitude determination apparatus and method that can be used with a ship docking system. GPS carrier phase measurements are used to determine attitude (i.e., azimuth and elevation angles) of a moving platform. With two separate GPS receiver/antenna combinations, phase measurements are processed to determine a precise vector from one antenna phase center to the other. The azimuth and elevation of a baseline vector are then computed. Float ambiguities between the two receiver antennas are determined, and are used to provide initial estimates of antenna baseline length and attitude. A search procedure is then employed to find the actual integer ambiguities. Only GPS observables, are needed; no other external data input is required.

The method and system of this invention provides a search through floating point ambiguities which provides initial estimates that are used to narrow the size of the window of a search through integer ambiguities. The search through floating point ambiguities is relatively quick because of the coarse resolution. However, such a search through floating point ambiguities increases the accuracy and speed of a search through integer ambiguities by providing initial estimates for the integer ambiguity search.

One embodiment of an attitude determination apparatus in a portable ship docking system according to the invention can be carried by a pilot onto a ship and used as a navigation aid to assist in a final docking phase. The apparatus is portable, weighs less than 15 pounds, and can be very quickly installed on a ship, with a total setup time of less than 15 minutes. It can precisely determine instantaneous position and velocity of any point of the ship, as well as the ship's heading and its turning rate.

The invention accurately determines position, heading, heading rate, and velocity parameters using surveyed points on the ship relative to bow and stem positions. The surveyed points on the ship are mapped very accurately to latitudinal and longitudinal positions, thus enabling generation of accurate heading, heading rate, and velocity information, without needing a lengthy alignment or system initialization. On a surveyed ship, a portable attitude determination unit can be installed to provide accurate position, heading, heading rate, and velocity information within 15 minutes.

In a ship docking system according to the invention, each ship reports its own ship data to a reference station using the portable attitude determination apparatus of the invention on each ship for ship attitude determination. The reference station correlates all the ships' data and communicates the correlated data to all of the reporting ships. Pilots on these ships and a harbor master on shore, can use this data for docking and navigation, such as in a display of surrounding ship and geographic data and an alert system for collision avoidance.

BRIEF DESCRIPTION OF THE DRAWINGS

The invention is described in detail with reference to the following drawings wherein like numerals represent like elements, and wherein.

DETAILED DESCRIPTION OF PREFERRED EMBODIMENTS

Figure 1:
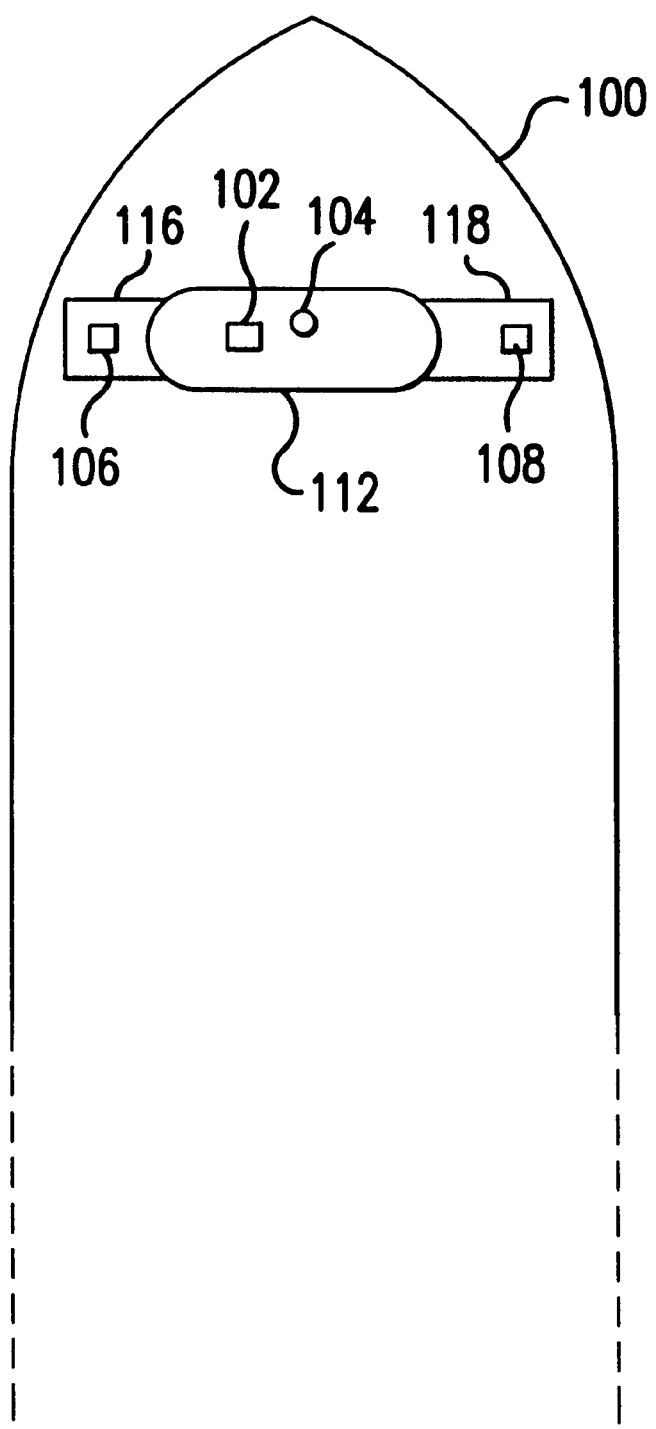
FIG. 1 illustrates a portable attitude determination ship docking apparatus aboard a ship.
Figure 2:
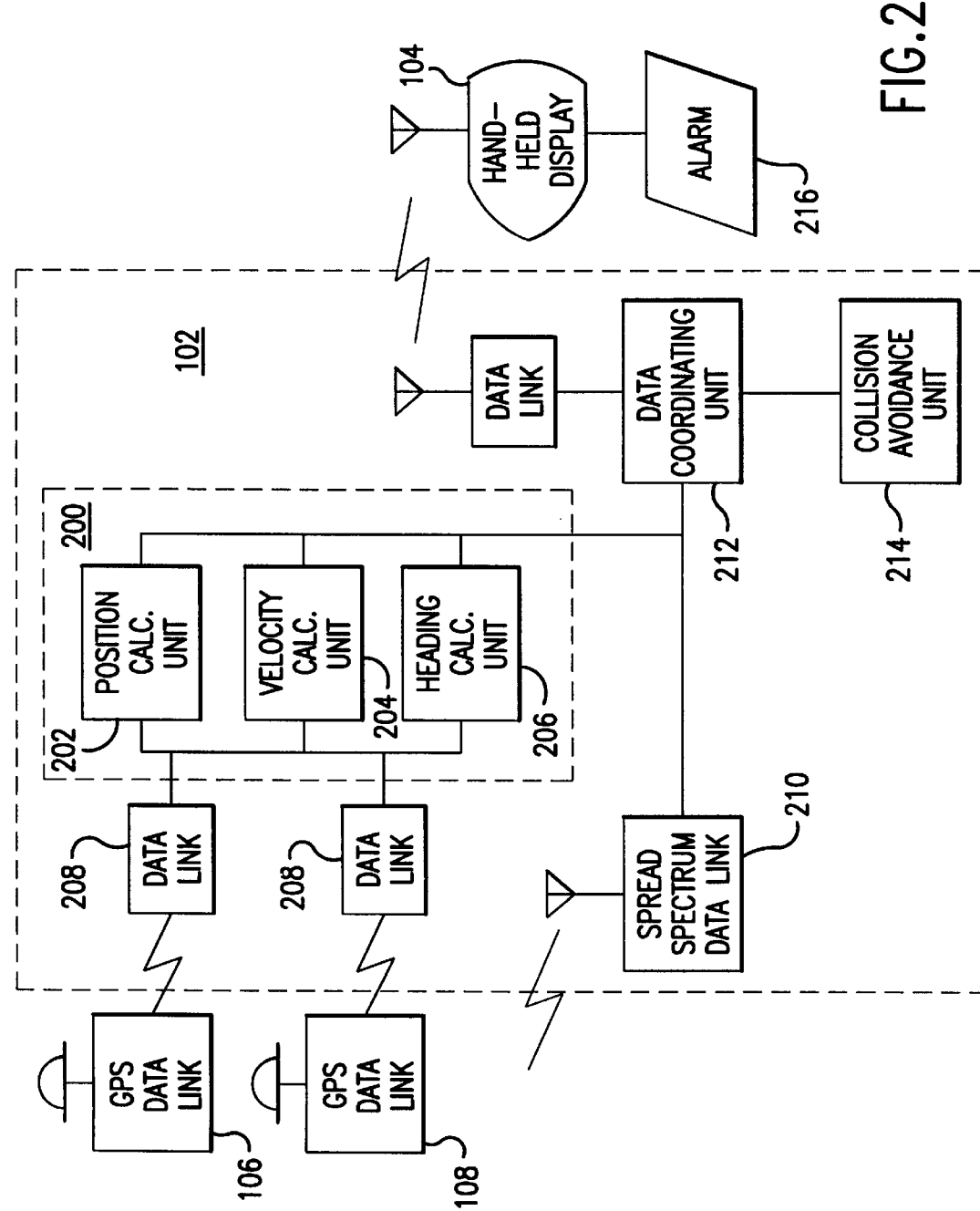
FIG. 2 shows components of one embodiment of a portable attitude determination apparatus according to the invention.

FIGS. 1 and 2 illustrate a configuration for one embodiment of the invention installed aboard a ship 100. A portable attitude determination unit (ADU) includes a bridge unit 102 that can be carried aboard the ship's bridge 112, although it can easily be operated from other parts of the ship 100 as well. A portable hand held display 104 displays data produced by the bridge unit 102. Two portable wing units 106 and 108 are placed near respective ends of the bridge wings 116 and 118 at surveyed locations. The wing units 106 and 108 are portably mounted and powered by any conventional means. For example, the wing units 106 and 108 can be battery powered and include magnet-mounted antennas.

The illustrated embodiment of the bridge unit 102 shown in FIG. 2 includes a ship attitude processor 200 including a position calculator 202, a velocity calculator 204, and a heading calculator 206. These three calculators may each form a portion of the same device, or may be distinct modules. In the illustrated embodiment, a spread spectrum data link 210 receives data from an onshore reference station. In one embodiment, the bridge unit 102 includes a 486DX4/100 processor with four serial ports.

The ship attitude processor 200 receives data from the wing units 106 and 108 via data links 208 and precisely computes the ship's position, velocity, and heading. A data coordinator 212 coordinates position, velocity, and heading data output by the ship attitude processor 200, and similar data concerning other ships received from the spread spectrum data link 210 (if any), and transmits display data to the hand held display 104. In the illustrated embodiment of the invention used with a ship docking system, a bridge collision avoidance unit 214 generates a collision warning using a hand held display alarm 216.

Figure 3:
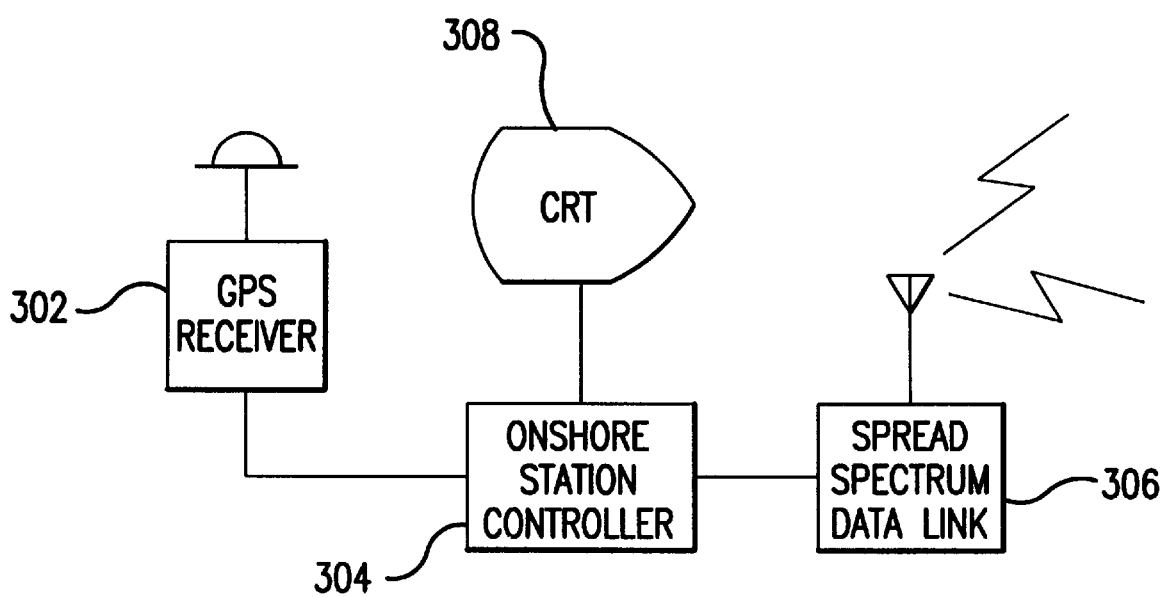
FIG. 3 shows components of one embodiment of an onshore reference station for a ship docking system according to the invention.

A reference station in a ship docking system according to the invention is illustrated in FIG. 3. Each ship has an ADU brought aboard by each ship's pilot as the ship approaches the harbor. The reference station includes an onshore GPS receiver 302 that receives GPS tracking data; an onshore station controller 304 that collects, coordinates, and disseminates the GPS tracking data and information from all vessels including position, velocity, and heading; a spread spectrum data link 306 which communicates with ADU's on all vessels; and an optional display 308.

In one embodiment of the ship docking system, the onshore reference GPS receiver 302 is installed on a choke ring ground plane to reduce the multipath effect. The choke ring is then mounted on a rigid platform with a clear view to the sky to maximize the all-in-view reception. Preferably, the receiver location should be surveyed to an accuracy of 3 inches.

The onshore GPS receiver 302 provides the following GPS tracking information to the onshore station controller 304:

GPS time;
number of satellite;
satellite ID;
pseudorange measurements;
pseudorange measurement standard deviations;
accumulated carrier phase measurements;
accumulated carrier phase standard deviations; and
age of continuous tracking.

The onshore station controller 304 broadcasts this information via the spread spectrum data link 306 to all shipboard ADUs. In return, each ADU broadcasts its ship's position, velocity and heading information back to the onshore station controller 304. The onshore station controller 304 combines the information from all of the ships and broadcasts the combined information back to all of the ships. The onshore station controller 304 connects to a monitor or CRT 308 to display surrounding geographic information as well as proportional ship icons. Since each ship now has all of the ships' information, a similar display can be generated on the hand held display 104 of each shipboard ADU. The onshore station controller 304, and/or each bridge unit 102, use this data for a ship collision avoidance system. If two ships are running courses that would cause a collision, then an alarm signal is immediately issued.

The bridge unit 102 accepts GPS data from the onshore station controller 304, computes the ship's position, velocity, and heading, and sends this information to the onshore station controller 304. The bridge unit 102 also receives the combined information for all nearby ships from the onshore station controller 304 and passes it to the hand-held display 104, thus allowing the pilot to visually observe the relative position and velocity of the ship in its surroundings.

The portable ADU combines easy installation with extremely high accuracy for position, heading, heading rate, and velocity determination. A method is now described for achieving extremely high accuracy in heading determination by processing GPS pseudorange and carrier phase measurements.

Figure 4:
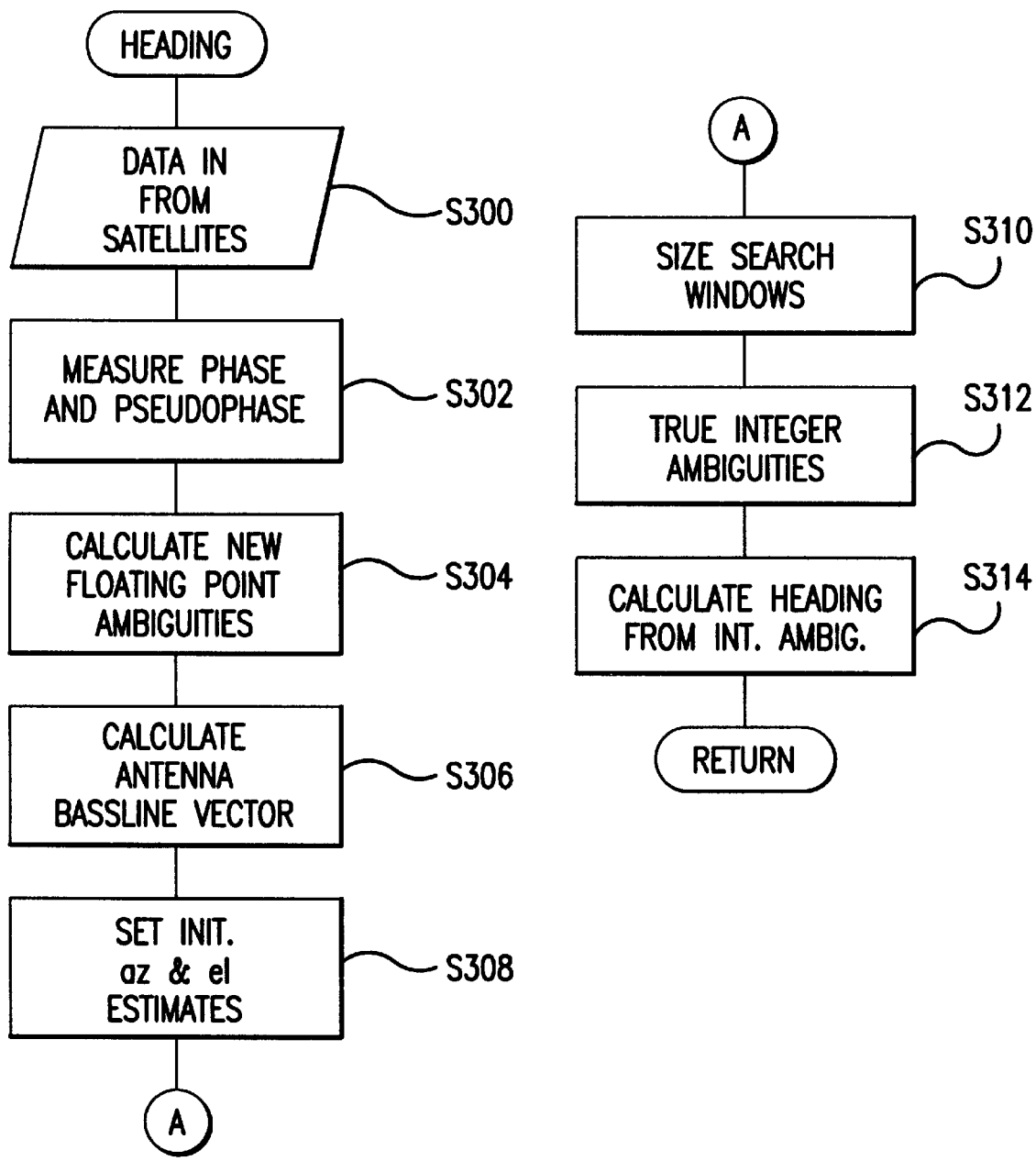
FIG. 4 is a flow chart of one embodiment of an attitude determination method according to the invention.

The attitude determination method according to the invention has two stages. In the first stage, the approximate orientation and length of an antenna baseline is found using floating point ambiguities. The second stage fine tunes the orientation and the antenna baseline length estimates by finding the actual integer ambiguities. FIG. 4 shows a control routine of an attitude determination processor according to the invention.

The control routine starts at step S300 where GPS data is received from the GPS satellites at wing units 106 and 108. The control routine then continues to step S302 where the phase and the pseudorange between receiver and satellite pairs are measured and the control routine continues to step S304. In step S304, the control routine filters the double difference floating point ambiguities from the differences between the phase and the pseudorange measurements. Next, at step S306, the control routine calculates an antenna baseline length using the float ambiguities and the phase measurements. The control routine then continues to step S308.

At step S308, the control routine estimates initial azimuth and elevation from the float ambiguities. The control routine then continues to step S310 where the sizes of the azimuth and the elevation search windows are determined based on the accuracy of the initial azimuth and elevation estimates. The control routine then continues to step S312 where the control routine determines the true integer ambiguities by conducting a search within the azimuth and elevation search windows. Next, at step S314, the control routine determines the ship attitude from the integer ambiguities.

This method is now explained in more detail. In steps S300 through S304, the control routine filters the double difference float ambiguity from the differences between the phase and the pseudorange measurements between receiver and satellite pairs. A prime satellite is selected as a reference for all other measurements.

At each epoch, the raw float ambiguity NF is calculated as:

$$NF_{BA}^{jp} = \phi_B^j - \phi_A^j - \phi_B^p + \phi_A^p - (\rho_B^j - \rho_A^j - \rho_B^p + \rho_A^p)/\lambda_1 \qquad (1)$$

where:
  $\phi$ is the phase measurement;
  $\rho$ is the pseudorange measurement;
  A and B denote the GPS receivers;
  p is the prime satellite;
  j=1, . . . ,n, j<>p where n is the number of common satellites tracked by the two receivers; and
  $\lambda_1$ is the L1 frequency wavelength, which is approximately equal to 19 cm.

At step S306, the control routine calculates the antenna baseline length using the float ambiguities and the phase measurements with a weighted least squares method, as follows:

Let $r_c^i$ denote the estimated range from receiver C to satellite i, C=A or B, i=1, ... ,n. With $u^i$ denoting the unit line-of-sight (LOS) vector from a receiver to satellite i, the measurement matrix H is:

$$H = \begin{pmatrix} -u_x^1 + u_x^p & -u_y^1 + u_y^p & -u_z^1 + u_z^p \\ \vdots & \vdots & \vdots \\ -u_x^n + u_x^p & -u_y^n + u_y^p & -u_z^n + u_z^p \end{pmatrix} \quad (2)$$

H has (n−1)×3 dimensions because there is no row for the prime satellite p. The weighting matrix R is the symmetric matrix of carrier phase measurement variances corresponding to the double differences which have been scaled for satellite elevation angle and phase track time. The one dimensional measurement vector L is:

$$L = \begin{pmatrix} \lambda_1(\phi_B^1 - \phi_A^1 - \phi_B^p + \phi_A^p) - r_B^1 + r_A^1 + r_B^p - r_A^p \\ \lambda_1(\phi_B^2 - \phi_A^2 - \phi_B^p + \phi_A^p) - r_B^2 + r_A^2 + r_B^p - r_A^p \\ \vdots \\ \lambda_1(\phi_B^n - \phi_A^n - \phi_B^p + \phi_A^p) - r_B^n + r_A^n + r_B^p - r_A^p \end{pmatrix} \quad (3)$$

N is defined as the (n−1)×1 vector of float ambiguities. Then the baseline vector $r_{AB}^e$ between antennas A and B in earth centered, earth fixed (ECEF) coordinates is:

$$r_{AB}^e = (H^T R^{-1} H)^{-1} H^T R^{-1} (L - \lambda_1 N) \quad (4)$$

When the float ambiguities have converged after a settling time, the control routine initiates a 3-dimensional search in azimuth, elevation, and baseline length to find the integer amibiguities. As step S308, the control routine obtains initial estimates of azimuth, elevation, and baseline length. The initial estimates are the final estimates obtained from the float ambiguity determination; i.e., the vector $r_{AB}^e$ from (4) is transformed to local level coordinates, from which azimuth and elevation can be found, while the baseline length is the magnitude of $r_{AB}^e$. In another embodiment of this invention, the GPS antennas are mounted on the same wing in relatively close proximity so that the distance between the antennas is known apriori (e.g., measured with a tape measure for instance), then the integer ambiguities can be found by performing the search that is described in the following paragraphs, except that the search is 2-dimensional in azimuth and elevation while the baseline length is constant. In this case, the initial estimates of azimuth and elevation must be supplied by some external source (e.g., a magnetic compass for azimuth and an inclinometer for elevation). At step S310, the control routine calculates the sizes of the search windows in each dimension based on the accuracy of the source of the initial estimates.

Next, at step S312, the control routine obtains the true integer ambiguities by computing the minimum of a cost function based on the phase measurements. Let $\alpha_i$, i=0, ... , k and $\beta_j$, j=0, ... , m, and $r_L$, l=0, ... , p, denote the azimuths, elevations, and baseline lengths respectively as they range over the search windows and define $\Delta\alpha$, $\Delta\beta$, and $\Delta r$ to be the corresponding step sizes of the azimuths, elevations, and length ($\alpha_i = \alpha_0 + \Delta\alpha$ and similarly for $\beta_j$ and $r_l$). Assume, without loss of generality, that the attitude of antenna B with respect to antenna A is to be found. With the latitude and longitude of antenna A given by $\phi_A$ and $\lambda_B$, for each $\alpha_i$, $\beta_j$, and $r_l$, compute the potential position of antenna B as:

$$\phi_B = \phi_A + \frac{r_l \cos(\alpha_i)\cos(\beta_j)}{r_m} \quad (5)$$

$$\lambda_B = \lambda_A + \frac{r_l \sin(\alpha_i)\cos(\beta_j)}{r_p \cos(\phi_A)} \quad (6)$$

For the case where the baseline length in known apriori, the $r_l$ are all constant and do not vary.

The control routine then obtains the range from receiver B to each of the satellites and calculates the residues by:

$$f_{ij} = \sum_{t=2}^{n} \text{frac}\left(\phi_B^t - \phi_A^t - \phi_B^1 + \phi_A^1 - \frac{r_B^t + r_A^t + r_B^1 - r_A^1}{\lambda_1}\right) \quad (7)$$

for i = 1, ..., k, j = 1, ..., m.

where it is assumed for simplicity that satellite 1 is the reference satellite for computing the double differences.

The frac( ) function takes the difference between the absolute value of its argument and the closest integer to the absolute value. Therefore, the result of frac( ) is always between 0 and 0.5.

The control routine then finds the global and the two local minima (if they exist) of the $f_{ij}$'s. Next, the control routine calculates the corresponding azimuth and elevation for the minima and computes the integer ambiguities for each of the attitude angles associated with the minima. The control routine then scales the minimum $f_{ij}$'s to produce a cost. The control routine accumulates the cost for three measurement epochs and then compares the lowest cost to the second lowest cost. If the ratio exceeds a predetermined limit, then the search is stopped and the control routine adopts integer ambiguities for the lowest cost as the true integer ambiguities.

Lastly, at step S314, the control routine finds the azimuth and elevation using equations (1) and (2) at each phase measurement epoch. The control routine monitors the ambiguities by performing the 2-dimensional search as discussed above, but centers the computed values of the azimuth and the elevation within a reduced search window. It is expected that the integer ambiguities found at the end of the initial search will be one of the three lowest minima in the reduced search. If those ambiguities are not one of the three lowest minima for a fixed number of times then the control routine declares a false fix and performs the search with a larger window. The control routine of this invention may also use other criteria to determine if a false fix has occurred. The invention is not intended to be limited to the criteria discussed above. One of ordinary skill in the art understands that other criteria may be used and still be within the scope of the invention.

While this invention has been described in conjunction with specific embodiments outlined above, it is evident that many alternatives, modifications and variations will be apparent to those skilled in the art. Accordingly, the disclosed embodiments of the invention as set forth herein are intended to be illustrative, not limiting. Various changes may be made without departing from the scope of the invention as defined in the following claims.

What is claimed is:

1. An apparatus for determining an attitude, comprising:
   a pair of GPS antennas capable of receiving GPS carrier signals from a plurality of GPS satellites; and a processor that determines the attitude based upon floating point ambiguities between said GPS carrier signals received by each of said pair of GPS antennas.

2. The apparatus of claim 1, wherein said processor determines said attitude by filtering the double difference floating point ambiguities from phase and psuedorange measurements taken by the pair of GPS antennas based on the GPS carrier signals.

3. The apparatus of claim 1, wherein said processor determines said attitude by calculating an antenna baseline length based on the floating point ambiguities and the phase measurements taken by the pair of GPS antennas based on the GPS carrier signals.

4. The apparatus of claim 1, wherein said processor determines said attitude by estimating initial azimuth and elevation values that are based upon said floating point ambiguities.

5. The apparatus of claim 4, wherein said processor determines said attitude by searching through a range of azimuth and elevation values, wherein the size of each of the ranges are based upon the accuracy of said initial azimuth and elevation values.

6. The apparatus of claim 5, wherein said processor determines said attitude by determining integer ambiguities based upon said search through said ranges of azimuth and elevation values.

7. The apparatus of claim 1, wherein said processor determines said attitude by permitting said floating point ambiguities to converge during a settling period.

8. The apparatus of claim 7, wherein said processor determines said attitude by conducting a 3-dimensional search through azimuth, elevation and baseline length values based upon said converged floating point ambiguities to establish initial estimates for azimuth, elevation and baseline length values.

9. The apparatus of claim 8, wherein said processor determines said attitude by conducting a second 3-dimensional search through azimuth, elevation and baseline length values to resolve integer ambiguities.

10. The apparatus of claim 9, wherein said processor determines said attitude by conducting said second search by computing the minimum of a cost function based on phase measurements taken by said pair of GPS antennas based upon said GPS carrier signals.

11. The apparatus of claim 1, wherein said baseline length is predetermined and said processor determines said attitude based on said floating point ambiguities and phase measurements taken by said pair of GPS antennas based upon said GPS carrier signals and said predetermined baseline length.

12. The apparatus of claim 11, wherein said processor determines said attitude by conducting a 2-dimensional search through azimuth and elevation values based upon said floating point ambiguities after said floating point ambiguities have converged during a settling period.

13. The apparatus of claim 12, wherein said processor determines said attitude by conducting a 2-dimensional search through azimuth and elevation values using initial estimates of azimuth and elevation from an external source.

14. The apparatus of claim 12, wherein said processor determines said attitude by conducting a 2-dimensional search in a search window whose size is based on the accuracy of initial estimates of azimuth and elevation values that are used for the search and which are based upon said floating point ambiguities.

15. The apparatus of claim 12, wherein said processor determines said attitude by conducting said 2-dimensional search by computing the minimum of a cost function based on phase measurements taken by said pair of GPS antennas based on said GPS carrier signals.

16. A method for determining an attitude, comprising:
receiving GPS carrier signals from a plurality of GPS satellites at a pair of GPS antennas; and
determining the attitude based upon floating point ambiguities between said GPS carrier signals received by each of said pair of GPS antennas.

17. The method of claim 16, wherein said determining comprises filtering the double difference floating point ambiguities from phase and pseudorange measurements taken by said pair of GPS antennas based on said GPS carrier signals.

18. The method of claim 16, wherein said determining comprises determining an antenna baseline length based on said floating point ambiguities and on phase measurements of said GPS carrier signals.

19. The method of claim 16, wherein said determining comprises estimating initial azimuth and elevation values that are based on said floating point ambiguities.

20. The method of claim 19, wherein said determining further comprises searching through a range of azimuth elevation values, wherein the size of each of said ranges is based upon the accuracy of said initial azimuth and elevation values.

21. The method of claim 20, wherein said determining further comprises determining integer ambiguities during said search.

22. The method of claim 16, wherein said determining comprises permitting said floating point ambiguities to converge during a settling period.

23. The method of claim 22, wherein said determining further comprises conducting a 3-dimensional search through azimuth, elevation and baseline length values based on said converged floating point ambiguities to establish initial estimates for azimuth, elevation and baseline length values.

24. The method of claim 23, wherein said determining further comprises conducting a second 3-dimensional search through azimuth, elevation and baseline length values to resolve integer ambiguities.

25. The method of claim 24, wherein said conducting said second 3-dimensional search comprises determining the minimum of a cost function based on phase measurements of said GPS carrier signals.

26. The method of claim 16, wherein said determining is further based on phase measurements of said GPS carrier signals and on a predetermined baseline length.

27. The method of claim 16, wherein said determining comprises conducting a 2-dimensional search through azimuth and elevation values after said floating point ambiguities have converged during a settling period.

28. The method of claim 27, wherein said searching is conducted using initial azimuth and elevation values from a source external to said pair of GPS antennas.

29. The method of claim 27, wherein said search is conducted in a search window whose size is based on the accuracy of initial estimates of azimuth and elevation values used for said search and which are based upon said floating point ambiguities.

30. The method of claim 27, wherein said conducting said 2-dimensional search comprises determining the minimum of a cost function based on phase measurements of said GPS carrier signals.

* * * * *